April 17, 1956 C. W. HANSELL 2,742,567
ELECTROMAGNETIC AMPLITUDE LIMITERS
Filed April 23, 1952
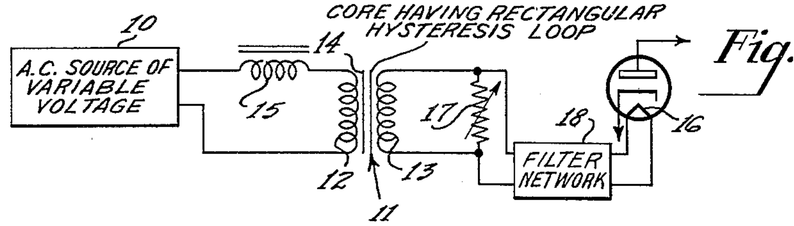
Fig.1.
Fig. 2.
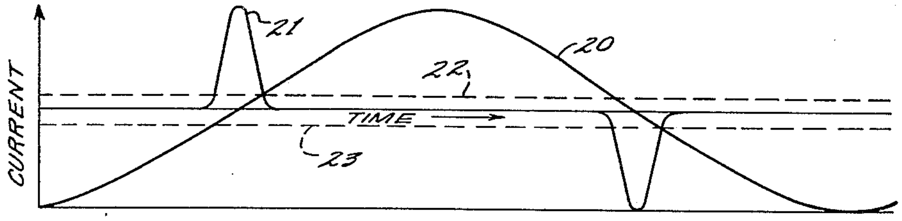
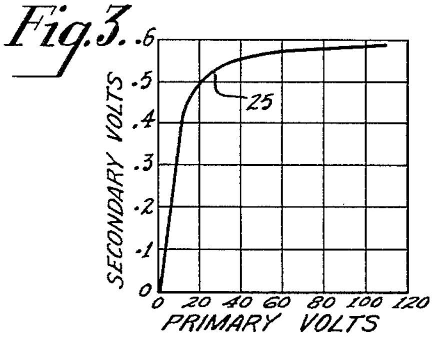
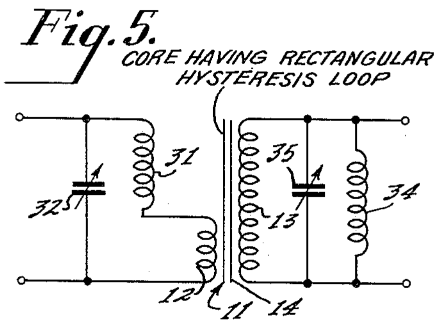
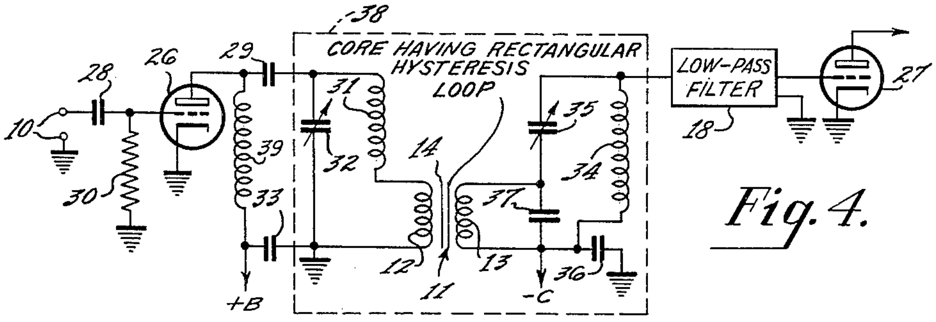
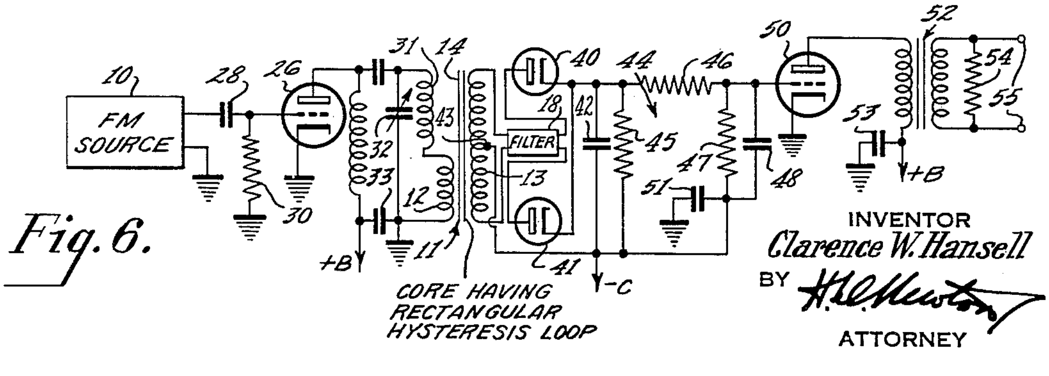
Fig. 6.
INVENTOR
Clarence W. Hansell
BY H. L. Newton
ATTORNEY United States Patent Office 2,742,567

Patented Apr. 17, 1956

2,742,567

ELECTROMAGNETIC AMPLITUDE LIMITERS

Clarence W. Hansell, Port Jefferson, N. Y., assignor to Radio Corporation of America, a corporation of Delaware Application April 23, 1952, Serial No. 283,856

3 Claims. (Cl. 250—27)

This invention relates generally to signal amplitude limiters, and has for its primary object to provide a signal amplitude limiting circuit network, the output power of which may be substantially independent of the alternating current power input impressed on the network.

Amplitude or current limiters are well known in the art. Thus, a current limiter may comprise a vacuum tube amplifier which is driven beyond plate-current saturation or which is operated to provide grid limiting thereby to limit the output current to a predetermined level which is nearly independent of the amplitude of the input current or voltage. Alternatively, an amplitude limiter may comprise a pair of rectifiers such as vacuum tube diodes which function as peak limiters to provide substantially square topped output pulses.

Amplitude or current limiters are conventionally used, for example, for limiting the amplitude of a frequency-modulated (FM) carrier wave. They are frequently utilized in FM receivers or in other FM systems where, for example, frequency-modulated pulses are reflected to determine altitude. Furthermore, in some cases, constant output power is required regardless of variations of the voltage of an alternating current input wave. Thus, for example, the filament of a thermionic tube is usually heated with an alternating current which should develop constant output power regardless of variations of the voltage of the input wave. However, for some applications a conventional limiter which requires either a vacuum tube amplifier or a pair of rectifiers is too expensive and, therefore, it would be desirable to provide a passive network for limiting the amplitude or current of an alternating current input wave.

It is, accordingly, an important object of the present invention to provide an improved alternating current amplitude or current limiter which comprises few electrical components and which does not require an amplifier or rectifier tube.

A further object of the invention is to provide an improved amplitude limiter suitable for deriving substantially a constant output power from an alternating current source of variable voltage or for limiting a frequency-modulated or a phase-modulated carrier wave to derive pulses of substantially equal width which may subsequently be counted or integrated to recover the modulation signal.

Another object of the invention is to provide a transformer network which, in combination with a filter network, will function as a current or amplitude limiter for an alternating current input wave.

In accordance with the present invention, a transformer is provided having a core which has a substantially rectangular hysteresis loop. As long as the input current is large enough to saturate the core in either polarity or direction of the alternating current input wave, the power developed in the output circuit of the transformer is substantially independent of the value of the input current but is a function of the frequency of the input current provided a suitable filter network or low pass filter is included in the output circuit. Accordingly, a transformer in accordance with the present invention having a core with a substantially rectangular hysteresis loop in combination with a low-pass filter function as an amplitude or current limiter.

The transformer of the invention may, for example, be used to supply substantially constant power through a suitable filter network to the filament of a thermionic tube supplied from an alternating current source of variable voltage. Alternatively, the transformer of the present invention may be used in an FM system together with a low-pass filter for removing any undesired amplitude variations of an FM wave. Such systems may include FM receivers, telemetering systems, frequency meters and the like. Finally, the transformer of the invention may be utilized in a frequency-modulation detector system of the type disclosed and claimed in the patent to Hansell 1,813,922 entitled "Detection of Frequency Modulated Signals."

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is a circuit diagram of an amplitude limiter in accordance with the invention suitable for supplying substantially constant energy to the filament of a thermionic tube;

Figure 2 is a graph illustrating the primary and secondary currents of the transformer included in the circuit of Figure 1 as a function of time;

Figure 3 is a graph illustrating the secondary voltage of the transformer of the circuit of Figure 1 as a function of the primary voltage;

Figures 4 and 5 are circuit diagrams of amplitude limiters for FM waves embodying the present invention; and Figure 6 is a circuit diagram of a limiter and pulse counting or integrating network for detecting an FM wave in accordance with the invention.

Referring now to the drawing where similar elements are designated by the same reference numerals throughout the figures, and particularly to Figure 1, there is illustrated an amplitude limiter for supplying substantially constant energy to the filament of a thermionic tube. The circuit of Figure 1 includes an alternating current source 10 of variable voltage and substantially constant frequency. Thus, the source 10 may, for example, be a sixty cycle power line. A transformer 11 is connected to the output terminals of the source 10 and includes a primary winding 12 and a secondary winding 13. The transformer 11 further includes a core 14 having a substantially rectangular hysteresis loop as indicated in Figure 1. The input circuit is completed by a reactive impedance element 15 such as an inductor which is serially connected with the primary winding 12 and the source 10.

The rectangular hysteresis loop of the core 14 is obtained by heat treating a core of a suitable alloy, while it is subjected to a magnetizing force substantially parallel to the direction of the magnetic flux of the transformer 11. This heat treatment lines up the minute magnetic dipoles or domains in the core material. Consequently, the lined up magnetic dipoles give to the material a higher permeability at a relatively low magnetizing force, but also a relatively sharp point of saturation and a retentivity so that the saturation value of the magnetic flux in one direction is substantially retained when the magnetizing force is removed. Consequently, a substantial reverse magnetizing force is required to reverse the direction of magnetization. However, the range or limits of reversed magnetizing force within which the flux starts to reverse and then reaches saturation in the reverse direction is relatively small. This, of course, causes the substantially rectangular hysteresis loop.

The above described heat treatment tends to produce a rectangular hysteresis loop in a variety and range of alloys. One of the materials which may be used for this purpose is an alloy consisting of 50% nickel and 50% iron. This alloy is produced in the form of a very thin ribbon which is insulated with a very thin layer of some material which will withstand high temperatures such as sodium silicate or silica from a colloidal water solution of silica known as silicic acid or silica gel which dissociates into silica and water when heated. This insulated thin ribbon is now wound into a ring core and is then heat treated while subjected to a magnetic field developed by an electric current flowing through the hole in the ring.

The system of Figure 1 includes an output circuit coupled to the secondary winding 13. The output circuit may, for example, include a filament 16 connected across the secondary winding 13. The filament 16 heats a cathode which forms part of a thermionic tube such as a diode, as shown, or a triode, tetrode or pentode, for example. Preferably, a variable resistor 17 is connected in shunt with the secondary winding 13 but alternatively the variable resistor may be connected in series with the secondary winding 13 and the filament 16.

If the load for the limiter of Figure 1 is a pure resistance such as the filament 16, the output power is not independent of the input voltage but increases as the voltage is increased. This comes about because, as the input voltage from source 10 is increased, the rate of change of flux, in the transformer core 14 having the rectangular hysteresis loop, increases with the voltage. There is then delivered to the resistance load, or to the filament 16 pulses of current which increase in peak value while at the same time they decrease in length. An increase in input voltage which doubles the flux rate of change, and doubles the peak pulse output voltage, increases the peak power of each pulse by four to one, while at the same time the pulse length is cut in half. The total energy per pulse is then twice as great. In an idealized case, therefore, the R. M. S. output voltage, instead of being independent of the input voltage is proportional to the square root of the input voltage.

Another way of looking at this result is to say that, as the input voltage is increased, the output pulses in becoming shorter, occupy a greatear frequency band width and the energy used in widening the frequency band provides the increased power to the load.

In accordance with the present invention, this defect is avoided by limiting the output frequency bandwidth by a filter network 18 shown in Figure 1. If, for example, only the fundamental frequency component of the output pulses reaches the load or filament 16, then the limiter gives the intended theoretically perfect result.

If the limiting is great enough, it may not be necessary to limit the output to the fundamental frequency component but instead we may pass the third, fifth or higher odd harmonic frequency components. All that is required is that over the range of input voltage variations which are to be permitted, the variation in bandwidth of the output pulses be substantially all in the range of frequencies which is to be eliminated by the filtering.

In many practical cases, such as the circuit of Figure 1, sufficient filtering may be obtained by means of an inductance in series with the load, which may be leakage inductance of the limiter transformer 11.

The reactive impedance element or inductor 15 may be adjustable to control the total current flowing through the primary winding 12. The variable resistor 17 adjusts the current flowing through the filament 16. However, the current flowing through the primary winding 12 should be larger than is necessary to saturate the core 14, first in one polarity and then in the other polarity taking into account any countermagnetizing current which may be developed in the output circuit including the secondary winding 13. Under these conditions, the secondary winding 13 will deliver power to the load, that is, to the filament 16 through the filter network or low-pass filter 18 which is substantially independent of the input current or input voltage and which is substantially directly proportional to the square of the frequency of the alternating input current. Accordingly, the output voltage and current will be substantially proportional to the frequency of the alternating current developed by the source 10 which, however, is assumed to be constant in the circuit of Figure 1.

Thus, the power supplied to the filament 16 and, therefore, the filament temperature can be made to be substantially constant in spite of relatively large variations of the voltage of the alternating current developed by the source 10. This will be better understood by reference to Figure 2 illustrating substantially the current 20 flowing in the primary winding 12 and the current 21 flowing in the secondary winding 13, both being plotted as a function of time. It will be noted that the secondary current 21 flows substantially in short pulses separated by time periods of very low or substantially zero current. This may be an advantage in heating the filaments of a rectifier because the filament current may more easily be made zero or substantially zero when anode current flows.

The dotted lines 22 and 23 shown in Figure 2 indicate the currents for which saturation of the core 14 is obtained. The current pulses 21 flow through the secondary winding 13 while the primary current 20 passes between dotted lines 23 and 22. Thus, as long as the current 20 flowing through the primary winding 12 is large enough to cause reversal of the magnetization, the energy transferred to the secondary winding 13 and through the filter network 18 to the output circuit is nearly independent not only of the value of the primary current, but also of the output load resistance represented by resistor 17 and filament 16 and of the transformer turns ratio. The amount of energy transfer per cycle of the alternating input current is determined primarily by the dimensions of the core 14. The electromagnetic amplitude limiter system of Figure 1 results in a low power factor for the current taken from the source 10. However, the power factor may be corrected, if desired, by static or synchronous machine capacitors as is well known.

Referring now to Figure 3, there is illustrated a curve 25 indicating the voltage across the secondary winding 13 as a function of the voltage applied to the primary winding 12. The curve was obtained by using a particular transformer having a rectangular hysteresis loop as described, with a resistor of 190 ohms in series with the primary winding 12 (instead of the inductor 15) and with a resistor 17 of 7 ohms. It will be seen that the voltage across the secondary winding 13 remains nearly constant over a wide variation of the voltage applied across the primary winding 12. The primary winding 12 for this experiment had 60 turns and the secondary winding 13 had 10 turns.

In the system of Figure 1 it was assumed that the frequency of the alternating current developed by the source 10 remains substantially constant, while its voltage was assumed to be variable. However, the amplitude limiter of the invention may also be utilized in connection with a source of variable frequency which may, for example, be an FM wave of which audio frequency currents shifted in frequency in accordance with telegraph signals would be one example. Such an amplitude limiter for an FM wave is illustrated in Figure 4. The circuit of Figure 4 includes two amplifiers 26 and 27 which may be triodes as shown. The input terminals 10 are coupled between the grounded cathode and the control grid through coupling capacitor 28, and the control grid is grounded through grid leak resistor 30. As explained hereinbefore, the wave impressed on the input terminals 10 may be an FM wave or a phase-modulated wave.

A parallel resonant circuit including inductor 31 and adjustable capacitor 32 is connected between the anode of tube 26 and ground through a blocking condenser 29. Direct current is supplied to the anode of tube 26 through a choke coil 39 from the +B power supply. Thus, no direct current flows in the transformer primary winding 12. The anode voltage supply +B may be bypassed to ground through bypass capacitor 33. The primary winding 12 of the transformer 11 may be connected in series with the inductor 31. The primary winding 12 and the secondary winding 13 of the transformer 11 again are provided with a core 14 having a substantially rectangular hysteresis loop.

Another parallel resonant circuit including inductor 34 and adjustable capacitor 35 is coupled to the secondary winding 13 and may be connected to the control grid of the amplifier 27 through low-pass filter 18. A suitable source of grid bias voltage indicated at −C is connected to the secondary winding 13 and may be bypassed to ground through bypass capacitor 36. Accordingly, the secondary winding 13 is capacitively coupled to the parallel resonant circuit 34, 35 so that harmonic frequencies generated in the transformer 11 may be bypassed through bypass capacitor 37 connected across the secondary winding 13.

As long as the transformer 11 is saturated in both polarities by the current impressed on the primary winding 12 during each cycle of the input current, then the effective current delivered to the control grid of the amplifier 27 is substantially independent of the current impressed on the primary winding 12.

However, the capacitor 37 across the secondary winding 13 should not short circuit the transformer 11 too well for fundamental and harmonic frequencies, because otherwise the magnetizing force applied to the core 14 may be too low. Therefore, the transformer 11 should have substantial leakage reactance in the secondary winding 13 or alternatively an impedance element should be added in series with the secondary winding 13 so as to permit the core 14 to be saturated in either polarity.

A modification of the amplitude limiter of Figure 4 is illustrated in Figure 5 and may be substituted for the dotted rectangle 38 of Figure 4. The input circuit connected to the primary winding 12 is substantially the same as that of Figure 4. The output circuit coupled to the secondary winding 13 consists only of the parallel resonant circuit 34, 35 which is directly connected across the secondary winding 13.

Figure 6, to which reference is now made, illustrates an amplitude limiter in accordance with the present invention followed by a rectifier and pulse counting or integrating network of the type illustrated in the Hansell patent above referred to. The FM source 10 is coupled to the amplifier 26 having a parallel resonant output circuit 31, 32 which is coupled to the primary winding 12 of the transformer 11. The transformer further includes the secondary winding 13 and the core 14 which again has a substantially rectangular hysteresis loop. Low-pass filter 18 follows the secondary winding 13.

In the manner above explained, when the system is properly designed, pulses will be developed across the low-pass filter 18 which are substantially independent of the current flowing through the primary winding 12 but which are a function of the frequency of the FM wave developed by the source 10.

In the manner explained in the Hansell patent, these pulses are rectified by a full wave rectifier including the two rectifiers 40 and 41 having their anodes connected to the terminals of the filter 18. The two cathodes of the rectifiers 40, 41 are connected together and the capacitor 42 is connected between the cathodes of the rectifiers 40, 41 and the midpoint 43 of the secondary winding 13. The capacitor 42 will integrate the rectified output current from the two rectifiers 40, 41 which is representative of the modulation signal with which the FM wave is modulated.

Preferably a low-pass filter 44 is coupled to the rectifier output and includes the resistors 45, 46 and 47 connected in a closed loop shunting the capacitor 42. Resistor 47 is directly shunted by capacitor 48 while resistor 45 is directly shunted by the capacitor 42. The network 44 includes resistors 45 to 47 and capacitors 42, 48 and functions as a low-pass filter.

Again the rectified output current from the rectifiers 40, 41 is substantially independent of the amplitude of the current flowing through the primary winding 12 as long as the primary current is high enough to saturate the core 14 in both polarities, taking into account the currents flowing through the secondary winding 13. However, the rectified output current is substantially directly proportional to the frequency of the FM wave.

Accordingly, the demodulated signal is developed across the low-pass filter 44 which may be connected between the control grid and cathode of an output amplifier 50. A grid bias source −C may be connected through the network to the grid of output tube 50, and to the midpoint 43 of the secondary winding 13 and may be bypassed to ground by bypass capacitor 51. An output transformer 52 may be connected between the anode of the output amplifier 50 and the anode voltage supply +B which may be bypassed by capacitor 53. A suitable load indicated at 54 may be connected across the secondary of the transformer 52 and the amplified output signal may be obtained from output terminals 55. In some cases output transformer 52 may be omitted and either direct or resistance-condenser output coupling used.

The rectifiers 40, 41 and the filter network 44 may be considered a pulse counter which counts or gives a response nearly proportional to the number of pulses per unit of time, the number of pulses per unit of time being representative of the signal.

There has thus been disclosed an electromagnetic amplitude or current limiter which consists essentially of a transformer network having a core with a substantially rectangular hysteresis loop followed by a filter network. This amplitude limiter or transformer network of the invention may be utilized to provide an output power which is substantially independent of the voltage of an alternating input current. Alternatively, the amplitude limiter of the invention may be utilized in an amplifier channel for limiting the amplitude of an FM wave or the like. Finally, the amplitude limiter of the invention may be utilized to develop output pulses representative of the frequency of an FM wave but substantially independent of its amplitude. These pulses may then be counted or integrated to develop the modulation signal.

What is claimed is:

1. An electromagnetic amplitude limiter comprising a transformer having a primary and a secondary winding, a core for said transformer having substantially a rectangular hysteresis loop, a frequency-modulated carrier wave circuit for supplying current of an amplitude to saturate said core in both polarities, a resonant input circuit coupling said carrier wave circuit across said primary winding, a resonant output circuit coupled across said secondary winding, and a low-pass filter coupled to said resonant output circuit for developing a frequency-modulated output wave having an amplitude which is substantially independent of the amplitude of the applied carrier wave.

2. An electromagnetic amplitude limiter as defined in claim 1 wherein said resonant output circuit is capacitively coupled to said secondary winding.

3. A frequency-modulated carrier wave detector system comprising means providing a source of frequency-modulated carrier waves, a transformer having a primary and a secondary winding, a core for said transformer having substantially a rectangular hysteresis loop, said first named means including a circuit coupled across said primary winding to provide current through said primary winding of an amplitude to saturate said core in both polarities, a first low-pass filter and full wave rectifier means connected in cascade and coupled across said secondary winding, said full wave rectifier means including a pair of rectifiers and an integrating circuit for integrating the current pulses developed by said rectifiers, and said rectifier means further includng a second low-pass filter for passing the modulation signal while rejecting carrier wave signals.

References Cited in the file of this patent

UNITED STATES PATENTS

| | | |
|---|---|---|
| 1,501,569 | Osnos | July 15, 1924 |
| 1,763,880 | Burton | June 17, 1930 |
| 1,813,922 | Hansell | July 14, 1931 |
| 1,836,574 | Burton | Dec. 15, 1931 |
| 1,936,153 | Burton | Nov. 21, 1933 |
| 2,047,312 | Demarest | July 14, 1936 |
| 2,374,746 | Hansell | May 1, 1945 |
| 2,423,225 | Chapin | July 1, 1947 |
| 2,520,480 | Tellier | Aug. 29, 1950 |